United States Patent Office 3,202,632
Patented Aug. 24, 1965

3,202,632
STABILIZATION OF VINYL RESINS WITH AN ALKALINE EARTH METAL PHENOLATE-CARBON DIOXIDE REACTION PRODUCT
Robert E. Lally, Verona, Frederick J. Ihde, Jr., Mountain Lakes, and Louis J. Pulver, Clifton, N.J., assignors to Nopco Chemical Company, Newark, N.J., a corporation of New Jersey
No Drawing. Filed May 2, 1962, Ser. No. 191,717
11 Claims. (Cl. 260—45.95)

This invention relates to the stabilization of vinyl halide resin compositions.

Halogen-containing vinyl resins are characterized by a very poor resistance to heat and light. As a result of exposure to heat and light these resins undergo degradation. This degradation or deterioration is manifested by discoloration and blooming as well as by a general weakening of the mechanical properties of the resin, i.e., the resin becomes brittle and loses strength. The extent of degradation is a function of the time of exposure to heat and light. For example, exposure to severe weather conditions and high processing temperatures in such operations as molding, milling and calendering has been found to induce resin degradation.

Accordingly, it is an object of the present invention to provide stabilizing compositions for stabilizing vinyl halide resins. Another object is to provide for heat and light stable vinyl halide resin compositions. It is another object to provide for the stabilization of these vinyl halide resin compositions during fabrication operations at which time elevated temperatures are employed. A further object is to stabilize these compositions during their use when they are exposed to varying weather conditions. Further objects will become apparent from the detailed description given hereinafter. It is intended, however, that the detailed description and specific examples do not limit the invention, but merely indicate preferred embodiments of the invention since various changes and modification within the scope of the invention will become apparent to those skilled in the art.

We have unexpectedly discovered that the above as well as other objects can be successfully realized by incorporating into the vinyl halide resin a stabilizer in amounts sufficient to stabilize the resin, said stabilizer being the reaction product of (1) alkaline earth metal phenolates and (2) carbon dioxide, the alkaline earth metal phenolate being the reaction product of an alkaline earth metal compound and a phenol wherein the amount of metal in the alkaline earth metal compound does not exceed 1.5 equivalents per one equivalent of the phenol.

It is known according to U.S. Patent No. 2,716,092 Leistner et al., August 23, 1955 to utilize particular metal phenolates as vinyl resin stabilizers. It is also known according to U.S. Patent No. 2,968,642 Le Suer, January 17, 1961 to stabilize vinyl chloride polymers with compositions obtained by preparing a mixture of (a) an alkylated monohydroxy aromatic compound, (b) an oil-soluble, metal-free non-tautomeric organic polar compound selected from the class consisting of neutral and basic compounds present in an amount greater than that of (a) on a weight basis, and (c) at least two equivalents of a basic barium compound per equivalent of (a) and heating said mixture to drive off substantially all free water which may be present and then treating said water-free mixture with an acidic gas having an ionization content greater than that of (a) until the titratable basicity of the mixture has been substantially reduced.

However, we have discovered that outstanding advantages accrue when using our stabilizers. For example, our stabilizers are characterized by reduced water sensitivity. They demonstrate improved compatibility with various stabilizer components including other stabilizers, solvents, plasticizers and, in fact, with the vinyl resin itself. Our stabilizers are characterized by both improved color stability and storage stability. Additionally, by utilizing our stabilizer, we are able to control the basicity of the polyvalent metal salt of the phenol.

The foregoing can be shown by the following. Untreated barium phenolate, when blended with organic phosphites, e.g., phenyl didecyl phosphite, and cadmium 2-ethyl hexoate in mineral spirits forms a heavy gel. As a consequence, special solvents such as alcohols are required to break this gel structure in order to obtain a usable product for stabilizing the resin. However, when the same blend of organic phosphite and cadmium 2-ethyl hexoate is combined with our stabilizer and then blended with mineral spirits, only a slight increase in viscosity occurs. No tendency to gel is observed. Thus, vinyl resin stabilizer blends including the reaction product of the aforesaid metal phenolates and carbon dioxide can be employed directly as stabilizers without need for further treatment.

Furthermore, when, e.g., barium phenolate is added to a common plasticizer such as di-octyl phthalate, the barium phenolate forms a haze of fine insoluble particles which slowly settle out of solution. On the other hand, the reaction product of barium phenolate in which the metal does not exceed 1.5 equivalents per equivalent of the phenol and carbon dioxide was found to be completely soluble in this same plasticizer yielding a clear solution. Similarly, the addition of our stabilizer to vinyl films brings about improved clarity when compared with the use of untreated phenolates such as barium phenolate.

Furthermore, phenolates, alone or in combination with other stabilizer components, gradually increase in color to a deep red-brown. On the other hand, our stabilizers do not increase in color but retain their original light amber color. Likewise, stabilizer compositions containing our stabilizers show no decrease in activity over an extended storage period of three to six months, while stabilizer compositions containing metal phenolates have been found to lose efficiency during the same period of time.

Another advantage accruing from our invention is that our stabilizers are light colored when compared with those stabilizers prepared from metal phenolates where the amount of metal is greater than 1.5 equivalents per equivalent of phenol. This is very important since the stabilizer is being added to colorless vinyl resin.

Finally, with our stabilizers, we are able to eliminate the organic polar compounds which heretofore have been present in stabilizer compositions wherein greater amounts of basic metal compound are used to prepare the phenolate.

Thus, it is clear that our novel stabilizers, which are the reaction products of particular metal phenolates and carbon dioxide, bring about new and unexpected advantages when utilized as stabilizers of vinyl halide resins. These advantages as previously indicated are absent in the prior art.

Our stabilizers can be prepared by treating an alkaline earth phenolate with carbon dioxide at temperatures from about 0° F. to 300° F. and preferably from about 80° F. to 300° F. As starting materials for our stabilizers, we use metal phenolates prepared by reacting together alkaline earth metal compounds and phenols. Generally speaking, the alkaline earth metal phenolates can be prepared by reacting together the alkaline earth metal compound such as an alkaline earth metal oxide or hydroxide with the desired phenol at temperatures from about 0° F. to about 700° F. preferably from about 80° F. to about 400° F. However, the amount of metal present in the alkaline earth metal compound does not exceed 1.5 equivalents per one equivalent of the phenol. If desired, some free phenol can be present without any adverse affects upon stabilization, such as when the phenol is present in a stoichiometric excess with respect to the alkaline earth metal compound.

The phenols which are reacted with the alkaline earth metal compounds are hydrocarbon substituted phenols which vary in molecular weight from about 154 to about 431. The hydrocarbon substituents on the phenolic nucleus can be alkyl, aryl or alkaryl and may be substituted in the ortho, meta, or para positions in the phenolic nucleus. They may be present as the mono, tri, or di substitution.

Examples of useful phenols are amyl, octyl, iso-octyl, nonyl, dodecyl, octadecyl, and oleyl phenols; dibutyl, di-isobutyl, diamyl, di-octyl, dinonyl, and di-dodecylphenols; di-5-butyl-o-methylphenol (di-t-butyl-o-cresol), the corresponding p-compound, and the corresponding amyl and hexyl compounds; o- or p-phenylphenol, 2-methyl-4-toluylphenol, 3,4-dimethyl-5-phenlyphenol, and p-benzylphenol. Of course, mixtures of the above phenols, including isomeric mixtures, can be used. The hydrocarbon substituents on the phenols are selected so that they influence the stability characteristics of the resulting phenolate. Thus, we can use any combination of hydrocarbon substituents provided the desired stability and compatibility characteristics are obtained.

Regarding the alkaline earth metal compounds, they can be oxides and hydroxides of alkaline earth metals such as barium, strontium, magnesium and calcium and include barium oxide, barium hydroxide, strontium hydroxide, calcium oxide, calcium hydroxide, magnesium hydroxide and the like and including their hydrates as well.

While varying amounts of our new stabilizers can be incorporated in the vinyl halide resin in order to prevent or reduce degradation, we have found that amounts of from about 0.05% to about 10% by weight of the resin are particularly effective. It should be recognized that although effective stabilization is achieved when using the higher quantities of our stabilizers, the improvement or efficiency in stabilizing activity is not necessarily proportional to the quantity of stabilizer; and, hence, any slight improvement would not be commensurate with the increased cost. Preferably there is present from about 0.1% to about 5% of the stabilizing composition based upon the weight of the resin. The above proportions are based upon 100% active metal phenolate-carbon dioxide reaction product as heretofore defined.

Our stabilizers can be used alone or in combination with many of the known, conventional materials used in stabilizing vinyl halide resins. Such materials include metal organic salts, phosphites, thiophosphites, epoxy materials, polyhydric alcohols, etc. Examples of these materials can be found in Patent Nos. 2,711,401—Lally, June 21, 1955; 2,564,646—Leistner et al., August 14, 1951; 2,867,594—Hansen et al., January 6, 1959; 2,824,847—Fath, February 25, 1958; 2,564,194—De Nie et al., August 14, 1951; 2,671,064—Cowell et al., March 2, 1954; 2,459,746—Radcliff, January 18, 1949 and 2,734,881—Lally, February 14, 1956.

Examples of useful metal organic salts are the following as well as their mixtures.

Zinc acetate
Zinc propionate
Zinc 2-ethylhexoate
Zinc ricinoleate
Zinc naphthenate
Zinc tallate
Calcium acetate
Calcium propionate
Cadmium 2-ethylhexoate
Cadmium naphthenate
Cadmium ricinoleate
Cadmium tallate
Barium 2-ethylhexoate
Barium naphthenate
Barium ricinoleate
Barium tallate
Zinc benzoate These metal organic salts as well as their mixtures are well known compositions of matter. The cationic portion can be one or a mixture of metals such as calcium, barium, strontium, magnesium, zinc, cadmium, mercury, tin and lead. The anionic portion of the metal organic salt can be derived from one or a mixture of aromatic acids and fatty acids including commercially available fatty acids which in many instances are mixtures of the fatty acids listed below together with small amounts of other acids. Exemplary of these acids are:

Aliphatic acids:
  Saturated—
    Acetic acid
    Propionic acid
    2-ethylhexoic acid
    Capric acid
    Stearic acid
    Palmitic acid
    Lauric acid
  Unsaturated—
    Linoleic acid
    Linolenic acid
    Oleic acid
    Ricinoleic acid
Cycloaliphatic acids
  Naphthenic acids
Complex acids
  Castor fatty acids
  Tall oil fatty acids
  Rosin oil
  Rosin
Aromatic acids:
  Benzoic acid
  p-Tertiary butyl benzoic acid
  Toluic acid
  Salicylic acid The preparations of the metal organic salts are well known and our invention is in no manner limited by the preparation of this component. When used in the present invention, these metal organic salts are present in amounts up to about 10% by weight of the resin.

Examples of useful organic phosphites are: triphenyl phosphite, tricresyl phosphite, diphenyl cresyl phosphite, tributyl phosphite, trioctyl phosphite, tridodecyl phosphite, diphenyl mono dodecyl phosphite, di-2-ethylhexyl monophenyl phosphite, tribenzyl phosphite as well as the corresponding mono- and di alkyl or aryl phosphites such as dicresyl and dibutyl phosphite. Examples of useful organic thiophosphites are tri (decylthio) phosphite, tri (laurylthio) phosphite, tri (2-ethylhexyl) phosphite and tri (benzylthio) phosphite. When used in the present invention, these organic phosphites and thiophosphites are present in amounts up to about 10% by weight of the resin.

Examples of useful epoxy-containing materials are those set forth in Patent Nos. 2,564,194, De Nie et al., August 14, 1951 and 2,671,064, Cowell et al., March 2, 1954 and include epoxy-containing materials such as epichlorohydrin, styrene oxide, epoxidized soyabean oil, the hexyl and octyl esters of epoxy-stearic acid, epoxy resins derived from the reaction between epichlorhydrin and 2,2-bis (4-hydroxyphenyl) propane such as the commercially available resins designated as Epon 828, Epon 364 and Epon 1001. When used in our invention, these epoxy materials may be present in amounts up to about 50% by weight of the resin.

Exemplary of useful polyhydric alcohols are ethylene glycol, diethylene glycol, glycerol, pentaerythritol, dipentaerythritol, sorbitol, glyceryl monostearate, etc. When used in the present invention, these polyhydric alcohols can be present in amounts up to about 10% by weight by weight of the resin.

Exemplary of the vinyl halide resins which can be successfully stabilized by incorporation of our stabilizing compositions are the following: homopolymers of vinyl chloride, vinyl bromide and vinylidene chloride; copolymers of vinyl and vinylidene halides such as vinyl chloride, vinyl bromide and vinylidene chloride which contain in an amount up to about 20% by weight of the copolymer at least one ethylenically unsaturated monomer copolymerizable therewith such as vinyl acetate, styrene, diethyl maleate, maleic anhydride, acrylic acid esters, etc., and copolymers of vinyl chloride and vinylidene chloride in which the vinylidene chloride is present in amounts up to about 20% by weight of the total.

Various conventional materials which can be incorporated into the vinyl halide compositions are fillers such as asbestos, York Whiting (calcium carbonate, silica, talc, clay and diatomaceous earth; pigments such as chrome oxide green, titanium dioxide and phthalocyanine blue; plasticizers such as tricresyl phosphate, dibutyl phthalate, dioctyl phthalate, epoxidized soyabean oil, etc.; lubricants including metal soaps such as calcium stearate and barium stearate, waxes such as paraffin wax, carnauba wax and montan wax and refined oils and related materials such as mineral oil, stearic acid and lauric acid. The use of these ancillary materials is well known to those skilled in the art and hence the above enumerated ingredients are not to be taken in a limiting sense.

The preparation of the resin compositions is well known in the art. The ingredients, i.e., resin, stabilizer and other ancillary ingredients when used as mixed together and then milled, calendered, molded or extruded at temperatures of from about 175° F., to about 450° F. in order to prepare films, sheets and other filled and unfilled structures. The compositions described in the following examples were prepared and tested for stabilization in accordance with the following general procedure. Specific times and temperatures as well as any deviations are set forth in the specific example.

(1) The ingredients were blended together in a Hobart type mixer.

(2) The resulting blend, referred to as stock, was then dropped onto a roll mill heated at a temperature of 300° F. to 350° F.

(3) After the stock had been fluxed, banded and blended for five minutes on the mill, it was removed as a 20 mil sheet.

(4) Samples of the 20 mil sheet were then placed in a circulating air oven for various periods of time at a temperature between 320° F. and 350° F.

Since color change is the principal change indicative of the extent of degradation in vinyl resin systems, such was utilized as an indication of stabilization efficiency. In this manner, color changes of stabilized samples were compared visually.

The first five examples are directed to the preparation of the stabilizer, i.e., reaction product of polyvalent metal phenolate and carbon dioxide.

EXAMPLE I

A. *Preparation of barium nonylphenolate (neutral)*

672 grams (3.0 equivalents) of nonylphenol and 462 grams (3.0 equivalents) of barium hydroxide octahydrate (43% Ba) were dispersed in 1128 grams of high flash naphtha and reacted by heating at 156° C. until combination was complete as shown by removal of the theoretical water of reaction which is 262 grams.

B. *Preparation of reaction product of phenolate and carbon dioxide*

The barium nonylphenate prepared in part A above was treated with carbon dioxide gas for one hour at 80° C. A clear, amber colored solution which was suitable for use as a vinyl resin stabilizer was thus obtained. The solution contained 44% by weight of the reaction product of barium nonylphenolate and carbon dioxide.

EXAMPLE II

A. *Preparation of barium nonylphenolate (basic)*

168 grams (0.75 equivalent) of nonylphenol and 172 grams (1.0 equivalent) of barium hydroxide octahydrate (43% Ba) were introduced and agitated in 282 grams of mineral spirits and reacted by heating to 120° C. Reaction was considered complete upon recovery of the theoretical water of reaction.

B. *Preparation of reaction product of phenolate with carbon dioxide*

The barium nonyl phenolate prepared in part A above was treated with carbon dioxide at 110° C. for 30 minutes. A clear, amber liquid was obtained which was useful as a vinyl halide resin stabilizer. The solution contained 48.4% by weight of the reaction product of barium nonyl phenolate and carbon dioxide.

EXAMPLE III

A. *Preparation of barium octyl phenolate*

314 grams (1.5 equivalents) of octyl phenol, 231 grams (1.44 equivalents) of barium hydroxide octahydrate were brought together in 586 grams of naphtha and reacted at 120° C. In this manner, 1000 grams of a solution of barium octyl phenolate were obtained. It contained 10% by weight of barium.

B. *Preparation of reaction product of phenolate and carbon dioxide*

The solution prepared in part A was treated with carbon dioxide at 100° C. for 1.5 hours thus yielding a solution containing 43% by weight of the reaction product of barium octyl phenol and carbon dioxide.

EXAMPLE IV

A. *Preparation of strontium nonyl phenolate*

520.5 grams (2.4 equivalents) of nonylphenol, 303.4 grams (2.4 equivalents) of strontium hydroxide hydrate (33% Sr) were brought together in 379.5 grams of naphtha and reacted at 130° C.

B. *Preparation of reaction product of phenolate and carbon dioxide*

The resulting solution was then treated at 120° C. for one hour with carbon dioxide thus yielding a solution containing 64% by weight of the reaction product of strontium nonylphenol and carbon dioxide.

EXAMPLE V

A. *Preparation of barium dodecylphenolate*

108 grams (0.4 equivalent) of dodecylphenol and 58 grams (0.36 equivalent) of barium hydroxide octahydrate (43% Ba) were refluxed in 117 grams of high flash napththa until reaction was complete as shown by the removal of 34 grams of water. The reacted mass was filtered and yielded 242 grams (97% theoretical) of a clear deep brown liquid.

B. *Preparation of reaction product of phenolate and carbon dioxide*

The solution obtained from part A above was treated with carbon dioxide for one hour at 80° C. The resulting material was a clear olive-green solution containing 57% by weight of the reaction product of barium dodecylphenolate and carbon dioxide.

The following examples are directed to the utilization of our vinyl stabilizers in the stabilization of vinyl halide resins. In these examples, all of the ingredients were blended together as indicated in the preceding general procedure and milled for the length of time at the temperature specified in each example. All parts are parts by weight. Where used, the reaction products of the phenolates and carbon dioxide introduced into the blends in the form of solutions as prepared in the preceding examples and the weights given are the weights of the solutions which contain the reaction product of the phenolate and carbon dioxide as the active ingredient.

EXAMPLE VI

| Formulation | A (parts) | B (parts) | C (parts) |
|---|---|---|---|
| VYNW-5 [1] | 100 | 100 | 100 |
| Dioctyl phthalate | 40 | 40 | 40 |
| Stearic acid | 0.25 | 0.25 | 0.25 |
| Reaction product of barium nonyl phenolate and carbon dioxide [2] | none | 0.5 | 1.5 |

[1] Copolymer containing 97% by weight vinyl chloride and 3% by weight vinyl acetate.
[2] Product of Example I above.

All formulas were milled at 335° F. for 15 minutes. Samples were removed for examination at 3 minutes, 5 minutes, 10 minutes and 15 minutes.

Formula A was dark brown at three minutes and became gradually darker through 15 minutes. Formula B was very light yellow at 3 minutes and 5 minutes, light pink at 10 minutes and dark brown at 15 minutes. Formula C was light yellow through 10 minutes and only amber at 15 minutes.

EXAMPLE VII

| Formulation | A (parts) | B (parts) | C (parts) | D (parts) |
|---|---|---|---|---|
| VYNW-5 [1] | 100 | 100 | 100 | 100 |
| Dioctyl phthalate | 40 | 40 | 40 | 40 |
| Cadmium Octoate | 1.0 | 1.0 | 1.0 | 1.0 |
| Reaction product of barium nonyl phenolate and carbon dioxide [2] | none | 1.5 | 3.0 | 4.5 |

[1] Copolymer containing 97% by weight vinyl chloride and 3% by weight vinyl acetate.
[2] Product of Example I above.

All stocks were milled 5 minutes at 335° F. Formula A degraded on the mill and could not be removed. Formulas B, C, and D were tested further by heating in an oven at 350° F. Formula B was yellow at 15 minutes, black at 30. Formula C was yellow at 45 minutes, black at 60 minutes. Formula D was yellow at 75 minutes and black at 90 minutes.

EXAMPLE VIII

| Formulation | A (parts) | B (parts) | C (parts) | D (parts) |
|---|---|---|---|---|
| Geon 101 [1] | 100 | 100 | 100 | 100 |
| Dioctyl phthalate | 50 | 50 | 50 | 50 |
| Cadmium stearate | 1.0 | 1.0 | 1.0 | 1.0 |
| Reaction product of strontium nonyl phenolate and carbon dioxide [2] | none | 1.5 | 2.5 | 7.5 |

[1] Vinyl chloride homopolymer.
[2] Product of Example IV above.

After milling for five minutes at 335° F. all formulas were tested for color change (stability) at 350° F. in a test oven.

Formula A was yellow at 15 minutes, black at 30 minutes. Formula B was yellow at 45 minutes, black at 60 minutes. Formula C was yellow at 45 minutes, black at 75 minutes. Formula D was brown at 75 minutes and black at 120 minutes.

EXAMPLE IX

| Formulation | A (parts) | B (parts) | C (parts) |
|---|---|---|---|
| Geon 202 [1] | 100 | 100 | 100 |
| Dioctyl phthalate | 30 | 30 | 30 |
| Epoxidized soya oil | 5 | 5 | 5 |
| Triphenylphosphite | 1.0 | 1.0 | 1.0 |
| Cadmium caprate | 1.0 | 1.0 | 1.0 |
| Reaction product of basic barium nonyl phenolate and carbon dioxide [2] | none | 2.5 | 5.0 |

[1] Copolymer of vinyl chloride and vinylidene chloride.
[2] Product of Example II above.

The formulations were milled at 335° F. for five minutes and then oven tested at 350° F. Formula A was yellow at 45 minutes and dark brown at 60 minutes. Formula B was yellow at 60 minutes, amber at 75 minutes and black at 90 minutes. Formula C was yellow at 90 minutes and light amber at 120 minutes.

EXAMPLE X

| Formulation | A (parts) | B (parts) | C (parts) | D (parts) |
|---|---|---|---|---|
| QYSM-5 [1] | 100 | 100 | 100 | 100 |
| Dioctyl phthalate | 35 | 35 | 35 | 35 |
| Epoxidized soya oil | 5 | 5 | 5 | 5 |
| Tricresyl phosphate | 5 | 5 | 5 | 5 |
| Diphenyl mono decyl phosphite | 1.0 | 1.0 | 1.0 | 1.0 |
| Calcium carbonate | 30 | 30 | 30 | 30 |
| Titanium oxide | 5 | 5 | 5 | 5 |
| Cadmium octoate | 1.0 | 1.0 | 1.0 | 1.0 |
| Reaction product of barium dodecyl phenolate and carbon dioxide [2] | none | 1.5 | 3.0 | 4.5 |

[1] Homopolymer of vinyl chloride.
[2] Product of Example V above.

All stocks were milled for five minutes at 335° F. and oven tested at 350° F. Formula A was yellow at 45 minutes, dark brown at 120 minutes. Formula B was white through 90 minutes and light yellow at 120 minutes. Formula C was white through 90 minutes and yellow at 120 minutes. Formula D was light yellow at 60 minutes and pink at 120 minutes.

EXAMPLE XI

| Formulation | A (parts) | B (parts) |
|---|---|---|
| VYNW-5 | 100 | 100 |
| Dioctyl phthalate | 50 | 50 |
| Calcium carbonate | 20 | 20 |
| Titanium oxide | 2.5 | 2.5 |
| Cadmium stearate | 0.5 | 0.5 |
| Diphenyl decyl phosphite | 0.5 | 0.5 |
| Reaction product of barium nonyl phenolate and carbon dioxide [1] | none | 3.0 |

[1] Product of Example I above.

After milling for five minutes at 335° F., both formulas were oven tested at 350° F. Formula A was dark gray at 30 minutes, dark brown at 90 minutes. Formula B was only light yellow at 60 minutes and only light brown at 90 minutes.

EXAMPLE XII

| Formulation | A (parts) | B (parts) |
|---|---|---|
| Geon 121 [1] | 100 | 100 |
| Dioctyl phthalate | 70 | 70 |
| Reaction product of barium nonyl phenolate and carbon dioxide [2] | | 2.0 |
| Zinc octoate | | 0.5 |
| Mono phenyl di-decyl phosphite | | 2.0 |

[1] A vinyl dispersion homopolymer resin.
[2] Product of Example II above.

The above formulations were first fused for three minutes at 350° F. and then samples placed in the oven. After 6 minutes in the oven at 400° F., stock from formulation A had degraded to a strong brown color while stock from formulation B was essentially unchanged, i.e., it retained its original clear, colorless appearance.

Having described our invention, what we claim as new and desire to secure by Letters Patent is:

1. A composition of matter consisting essentially of
(I) A vinyl halide resin selected from the group consisting of:
   (1) homopolymers of vinyl chloride,
   (2) homopolymers of vinyl bromide,
   (3) homopolymers of vinylidene chloride,
   (4) copolymers of vinyl chloride containing in an amount up to about 20% by weight of said copolymer of at least one ethylenically unsaturated monomer copolymerizable therewith selected from the group consisting of vinyl acetate, styrene, diethyl maleate, maleic anhydride, esters of acrylic acid and vinylidene chloride, (5) copolymers of vinyl bromide containing in an amount up to about 20% by weight of said copolymer of at least one ethylenically unsaturated monomer copolymerizable therewith selected from the group consisting of vinyl acetate, styrene, diethyl maleate, maleic anhydride, esters of acrylic acid and vinylidene chloride, and (6) copolymers of vinylidene chloride containing in an amount up to about 20% by weight of said copolymer of at least one ethylenically unsaturated monomer copolymerizable therewith selected from the group consisting of vinyl acetate, styrene, diethyl maleate, maleic anhydride, esters of acrylic acid and vinyl chloride, and (II) an alkaline earth metal phenolate-carbon dioxide reaction product, present in stabilizing amounts, consisting of the reaction product prepared by reacting:

(1) an alkaline earth metal phenolate which is the reaction product of an alkaline earth metal compound selected from the group consisting of barium oxide, barium hydroxide, strontium hydroxide, calcium oxide, calcium hydroxide and magnesium hydroxide and a hydrocarbon substituted phenol having a molecular weight from about 154 to about 431 wherein the amount of metal in said alkaline earth metal compound does not exceed 1.5 equivalents per one equivalent of said phenol and contacting the resulting reaction product with, (2) carbon dioxide at a temperature of from about 0° F. to 300° F.

2. A composition of matter consisting essentially of
(I) a vinyl chloride resin and
(II) an alkaline earth metal phenolate-carbon dioxide reaction product, present in stabilizing amounts, consisting of the reaction product prepared by reacting:

(1) an alkaline earth metal phenolate which is the reaction product of an alkaline earth metal compound selected from the group consisting of barium oxide, barium hydroxide, strontium hydroxide, calcium oxide, calcium hydroxide and magnesium hydroxide and a hydrocarbon substituted phenol having a molecular weight from about 154 to about 431 wherein the amount of metal in said alkaline earth metal compound does not exceed 1.5 equivalents per one equivalent of said phenol and contacting the resulting reaction product with, (2) carbon dioxide at a temperature of from about 0° F. to 300° F.

3. The composition of claim 1 wherein said stabilizer is present in amounts of about 0.05% to about 10% by weight of said resin.

4. The composition of claim 2 wherein said stabilizer is present in amounts of about 0.05% to about 10% by weight of said resin.

5. The composition of claim 2 wherein said stabilizer is present in amounts of about 0.1% to about 5.0% by weight of said resin.

6. The composition of claim 4 in which said stabilizer is the reaction product of barium phenolate and carbon dioxide.

7. The composition of claim 4 in which said stabilizer is the reaction product of barium nonyl phenolate and carbon dioxide.

8. The composition of claim 4 in which said stabilizer is the reaction product of barium octyl phenolate and carbon dioxide.

9. The composition of claim 4 in which said stabilizer is the reaction product of barium dodecyl phenolate and carbon dioxide.

10. The composition of claim 4 in which said stabilizer is the reaction product of strontium phenolate and carbon dioxide.

11. The composition of claim 4 in which said stabilizer is the reaction product of strontium nonyl phenolate and carbon dioxide.

References Cited by the Examiner
UNITED STATES PATENTS

| | | | |
|---|---|---|---|
| 2,624,716 | 1/53 | Smith | 260—45.85 |
| 2,903,487 | 9/59 | Coffield | 260—45.95 |
| 2,921,901 | 1/60 | Karll et al. | 260—32.7 |
| 2,959,551 | 11/60 | Le Suer | 260—45.95 |

FOREIGN PATENTS

| | | |
|---|---|---|
| 837,466 | 6/60 | Great Britain. |
| 851,974 | 10/60 | Great Britain. |

WILLIAM H. SHORT, *Primary Examiner.*